United States Patent [19]
Frederickson et al.

[11] Patent Number: 5,485,392
[45] Date of Patent: Jan. 16, 1996

[54] MANUAL SOLDERING PROCESS MONITORING SYSTEM

[75] Inventors: Michael D. Frederickson; Stephen T. Kertis, both of Indianapolis; Joel A. Mearig, McCordsville; Alex E. Cragoe, Indianapolis; Frank Carpenter, Edinburgh, all of Ind.

[73] Assignee: The United States of America as represented by the Secretary of the Navy, Washington, D.C.

[21] Appl. No.: 304,335

[22] Filed: Sep. 12, 1994

[51] Int. Cl.⁶ .................................................... H05B 1/02
[52] U.S. Cl. ..................... 364/477; 219/241; 219/85.22
[58] Field of Search .............................. 219/85.2, 85.21, 219/85.22, 227, 228, 229, 233, 240, 241; 228/51–55; 364/477

[56] References Cited

U.S. PATENT DOCUMENTS

| | | | |
|---|---|---|---|
| 4,544,829 | 10/1985 | Adachi et al. | 219/241 |
| 4,891,497 | 1/1990 | Yoshimura | 219/241 |
| 4,935,600 | 6/1990 | Pachschwöll | 219/241 |
| 4,960,975 | 10/1990 | Weinbrecht | 219/241 |
| 5,014,210 | 3/1991 | Postlewait et al. | 364/477 |
| 5,062,564 | 11/1991 | Urban | 219/241 |
| 5,094,384 | 3/1992 | Urban | 228/177 |
| 5,223,689 | 6/1993 | Cowell et al. | 219/85.22 |

*Primary Examiner*—Paul P. Gordon
*Assistant Examiner*—Thomas E. Brown
*Attorney, Agent, or Firm*—James V. Tura; Susan E. Verona

[57] ABSTRACT

A system for monitoring the soldering process which comprises a soldering means including a means for monitoring analog heat flow, a means, connected to said soldering means, for converting analog heat flow readings into a digital temperature data points, a computing means, connected to said means for converting analog heat flow readings into digital data points, which smoothes the temperature data points; locates the beginning of the temperature data point decay; locates the beginning of the temperature data point recovery; calibrates the system for monitoring the soldering process; and classifies the current temperature data point input as an iron cleaning operation or a soldering operation.

14 Claims, 10 Drawing Sheets

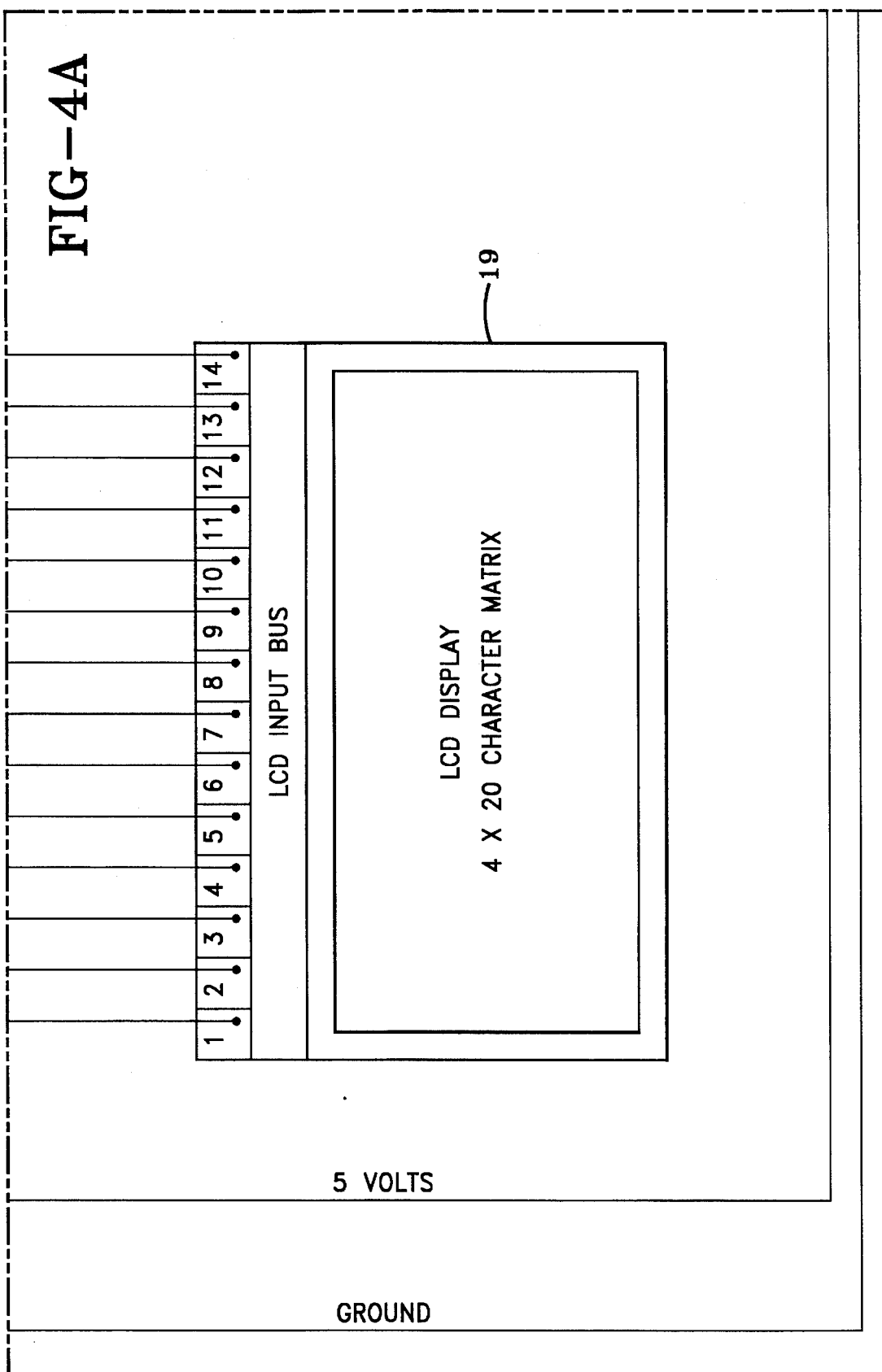

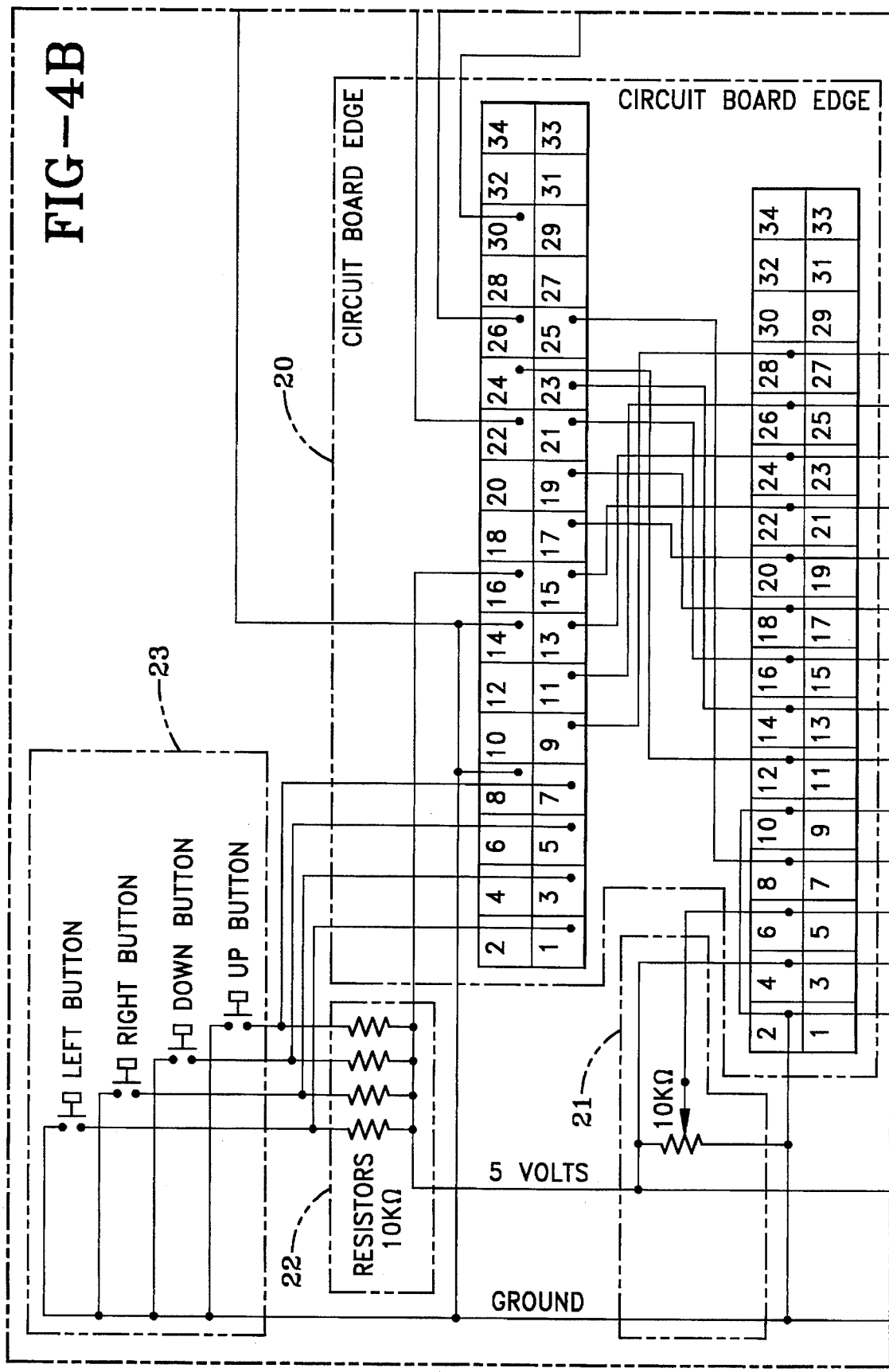

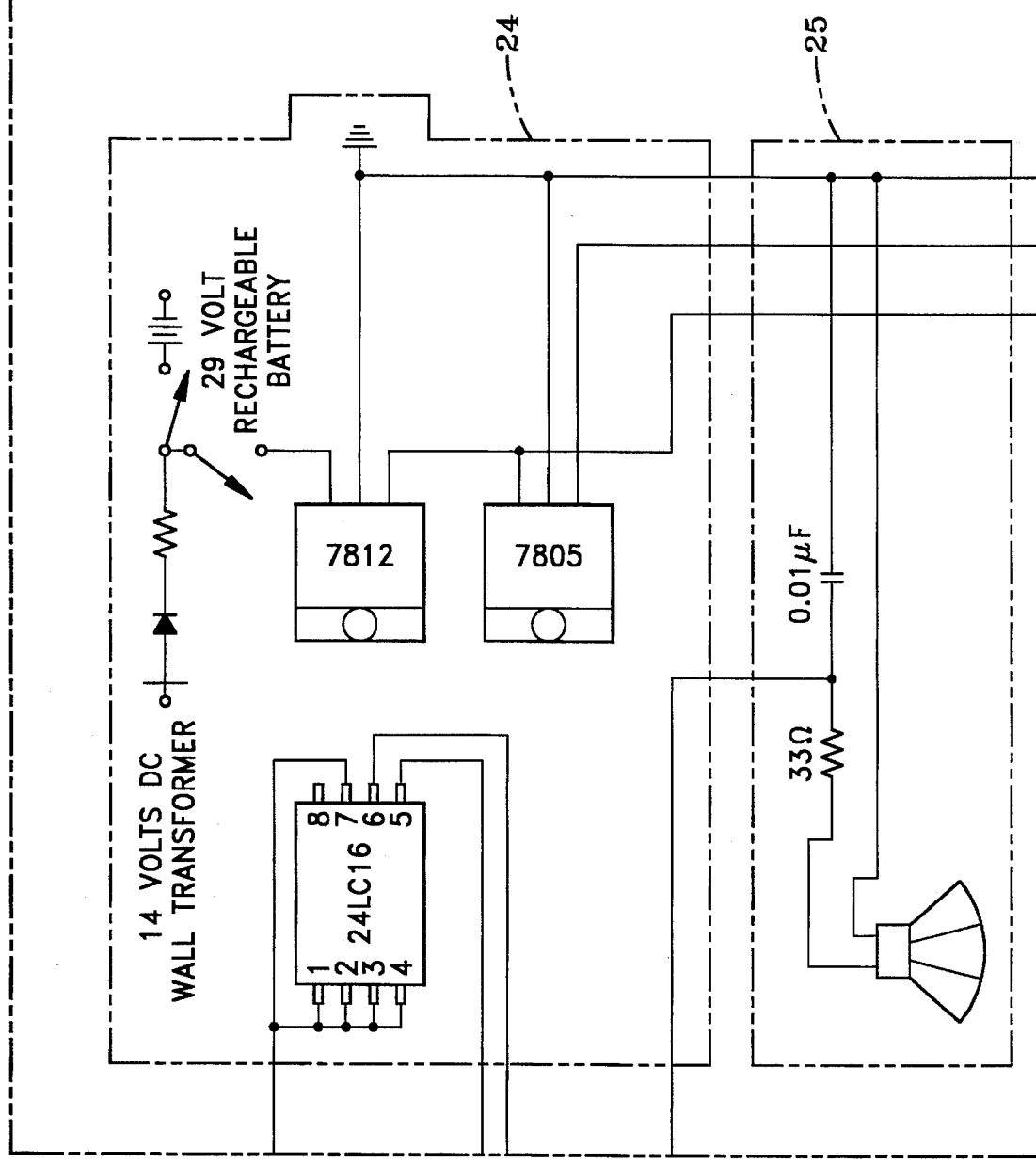

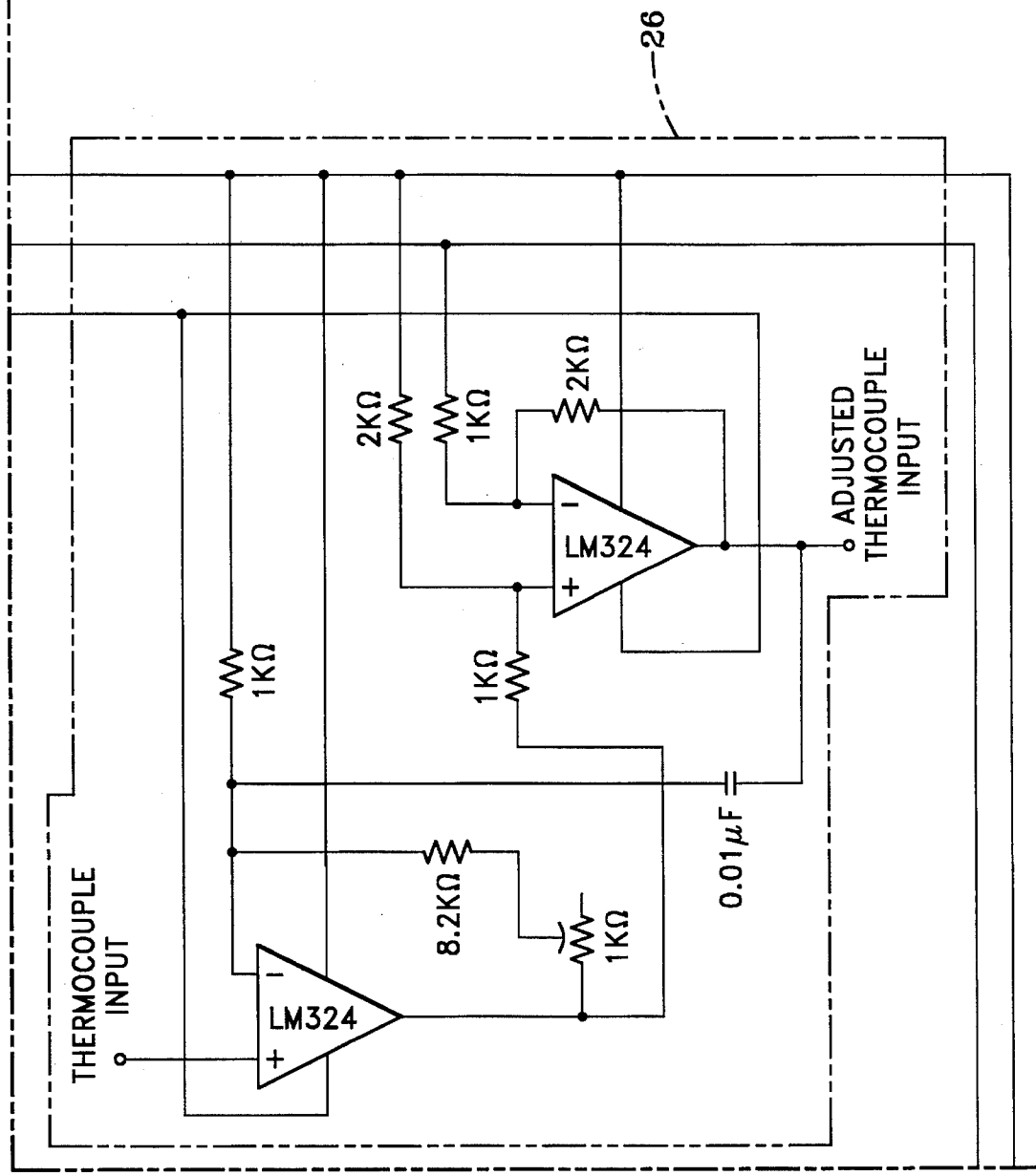

MANUAL SOLDERING PROCESS MONITORING SYSTEM

The invention described herein may be manufactured and used by or for the Government of the United States of America for governmental purposes without payment of any royalties thereon or therefor.

BACKGROUND OF THE INVENTION

The invention relates to an improved soldering process system for monitoring critical process variables including time-on-connection, tip temperature and heat transferred to each connection.

The objective in high reliability soldering is to maintain a constant tip temperature profile for each of the connections soldered and a constant time on contact. This consistency in temperature and time on contact provides a steady thermal profile for the entire assembly. The ideal tip temperature profile for a soldering tool is a straight line indicating no tip temperature lost. This ideal tip temperature profile is rarely achieved due to the small thermal mass of the soldering iron tip. The illusive nature of maintaining the ideal temperature profile is why a process control is needed in the manual soldering process. A manual soldering process is difficult to control because hum,ms do not repeat themselves with the same consistency and repeatability of a machine. Most electronics manufacturing devices generate statistical process control (SPC) information for management and process engineers. However, manual soldering currently does not produce any or very little statistical information leaving management, process engineers, and soldering operators in the dark about the performance of the manual soldering process. Critical characteristics, such as the number of solders performed per board, the soldering iron temperature drop and the time on contact are not regulated. It is therefore the object of this present invention to develop a soldering system that enables the process engineer to monitor these critical process variables. This information can be used to point to problems or to show that the probability of problems in the manual soldering process are small.

In manual soldering process design, the critical process variables can be controlled for quality production. Operator variability in the soldering process and the electrical characteristics of the iron are controllable and directly affect the solder connection reliability. An Operator Variability Coefficient (OVC) identifies the relationship between the operator's actions and response of the iron tip temperature. By using correlation analysis, the OVC can be derived to provide information on the consistency and control in the manual soldering process. The results can be used to ensure the production of reliable solder connections. Correlation analysis quantifies the mount of correlation between the variation in operator time on the connection and the variation in the tip temperature. The value obtained from this analysis generates a value between 0 and 1, where 1 is perfect correlation and 0 is the complete noncorrelation. Therefore, at the end of an assembly, the lower the correlation coefficient, the more stable the temperature during the assembly soldering process. The operator and the soldering iron's thermal characteristics affect the OVC. As the operator time between connections becomes more consistent, the correlation between time and temperature decreases or as the thermal decay of the tip becomes less time dependent.

The present invention automates the process monitoring technique by using a computer integrated system which allows observation of a manually controlled process in a reasonable and cost effective time frame. The manual soldering process system monitors real-time tip temperature, temperature drop, time-on-contact, and heat transferred during each soldering operation and generates a displays plotting tip temperature over time, comparisons of smoothed data over raw data, and statistical process control graphs over user specified periods of time, such as a single day, week, or a year. A wide range of graphs can be produced including mean and standard deviations for time on connection, mean and standard deviations of curve characterization, initial and average temperatures, total time to solder board and longest time on connection. The user can adjust critical software variables such as the smoothing coefficient, the number of consistent temperature decays or recoveries to check and soldering iron and tip being used.

The present invention provides the process engineer immediate information on the level of consistency and control for the manually driven process. Each reworked or soldered assembly has a characteristic variability coefficient. This variability coefficient becomes more refined over time with some process history. If the variability coefficient is higher than normal on a particular assembly it indicates that either the iron operator or assemble material is not controlled. With additional troubleshooting, the process can be adjusted before product reliability is impaired.

The inventor knows of no other soldering process control monitors in the prior art that predict operator clean and soldering operations and measure time on connection, tip temperature and heat transfer to the each connection and produce statistical process control graphs. Related prior art is concentrated on maintaining a constant tip temperature and not with the collection and analysis of the manual soldering process control statistics. For example, a related patent, U.S. Pat. No. 5,062,564 issued to Urban, discloses a soldering system that collects soldering tip temperature data and rapidly responds to tip loading, distinguishing between dean and solder decays in the temperature profile, and maintains a steady tip temperature.

BRIEF DESCRIPTION OF THE DRAWINGS

The invention is described in more detail, by way of example only, with reference to the following drawings. Additional features necessary to the invention will be evident from the drawings.

DETAILED DESCRIPTION OF THE PREFERRED EMBODIMENTS

Figure 1:
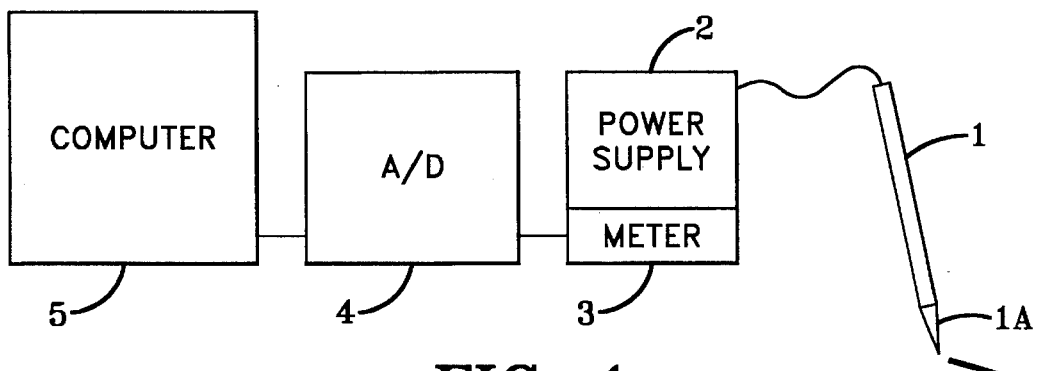
FIG. 1 is a block diagram of the invention.

Shown in FIG. 1 is a system for manual soldering that includes a soldering iron, a power supply 2, a means to monitor the heat being transferred by the soldering iron 3, an analog to digital conversion unit 4, and a computer 5. As heat is transferred to the soldering connection, the temperature of the soldering iron tip 1A changes and the voltage into the soldering iron fluctuates. The initial value needed by the Manual Soldering Process Monitoring System software is temperature. Many modern soldering irons have temperature sensors embedded in the soldering iron tip and an analog temperature reading would then be available for the Manual Soldering Process Monitoring System's analog temperature reading 3. One iron technology monitors the heat being transferred by the soldering iron 3 via an inline power meter. Voltage output fluctuations of the power meter are translated into a power reading and then the power readings are translated into a temperature reading. The preferred embodiment described below will describe the system using a standard Metcal type soldering iron and the initial heat transfer readings will be from the voltage fluctuations of an inline power meter within the soldering iron. The computer 5 is a standard personal computer or may be a single board computer dedicated to the manual soldering process monitoring system. The preferred embodiment of the invention utilizes a single board computer to enable real time feedback to an operator of the soldering iron.

Figure 2:
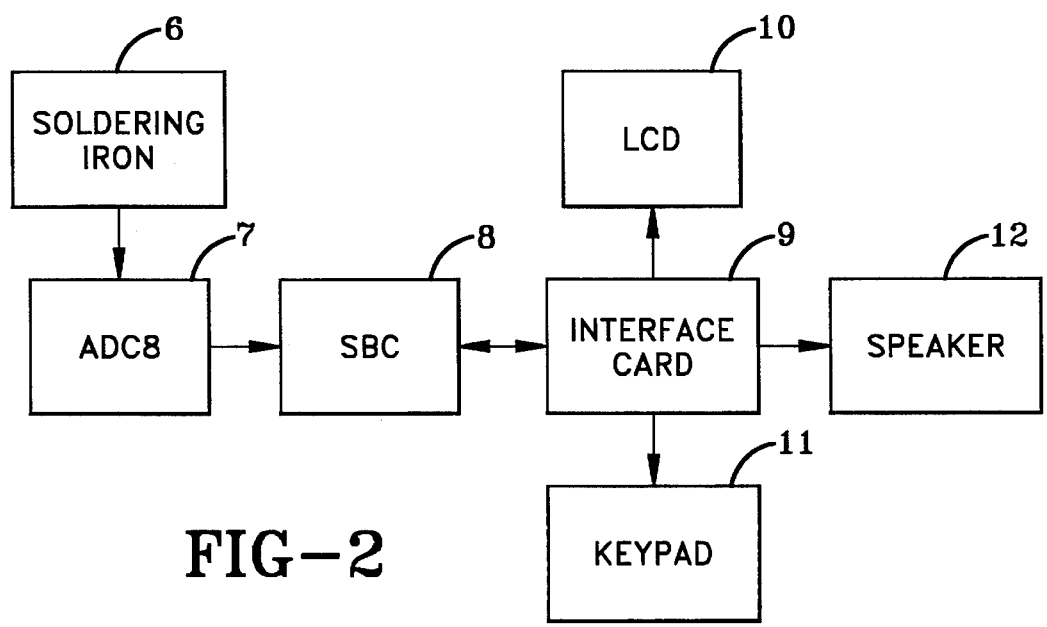
FIG. 2 is a block diagram of the real-time implementation of the invention.

The real time manual soldering process system in FIG. 2 includes the soldering iron and power supply 6, an 8 bit Analog to Digital Conversion board (ADC) 7, a Single Board Computer (SBC) 8, Interface Card 9, which interfaces the Liquid Crystal Display (LCD) 10 and speaker 12 as well as keypad 11 with SBC 8. An 8 bit system was chosen along with SBC 7 and ADC 6, in order to produce a low cost system. This enables an operator to adjust the voltage range in which the system will monitor analog voltage fluctuations for greater sampling accuracy.

Figure 3:
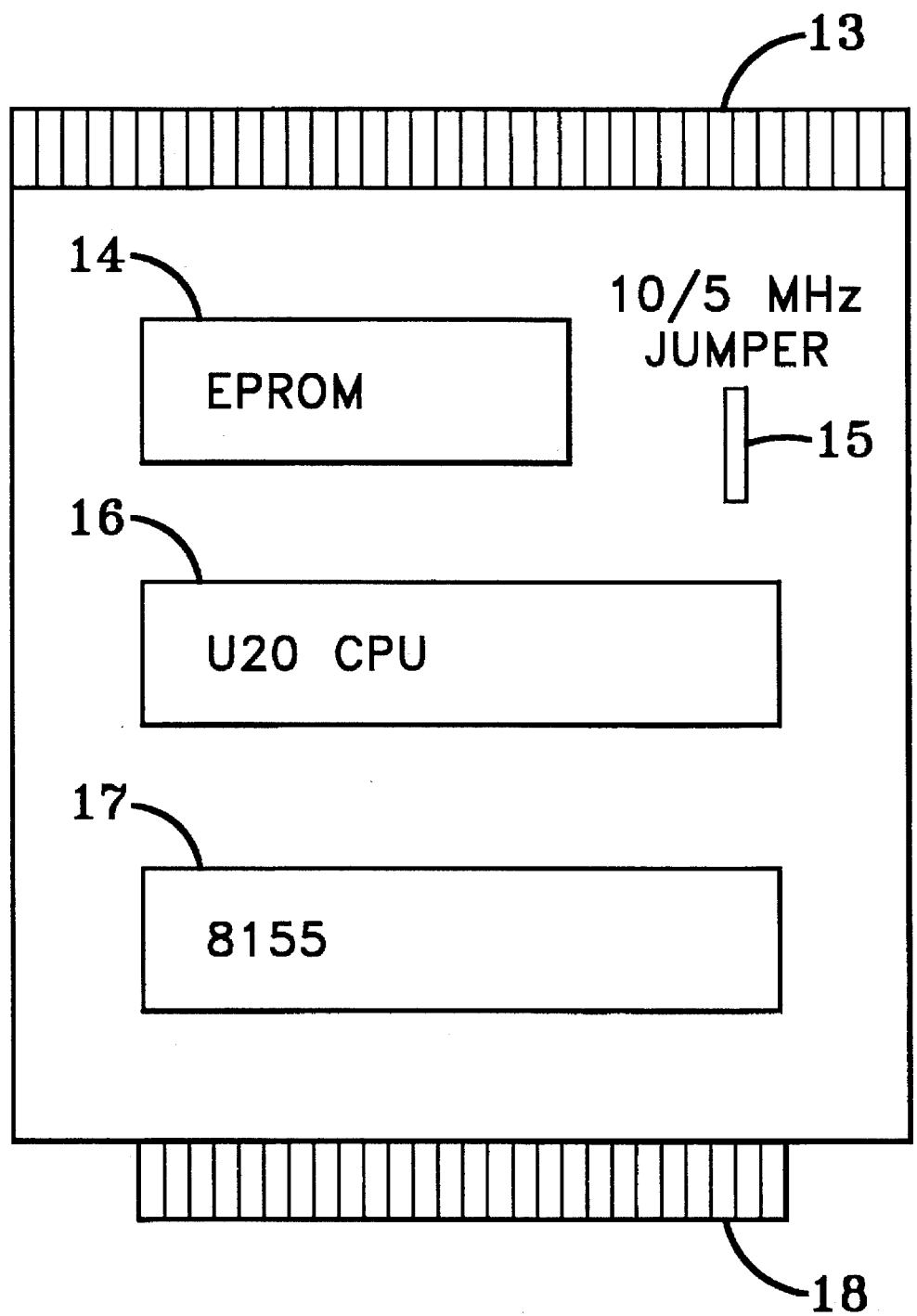
FIG. 3 is a board layout used in the preferred embodiment of the invention.

For the preferred embodiment an off-the-shelf, readily available 8088 compatible CPU 15 is used because of it's low cost and the wide range of programing support tools. This commercially available single board computer (SBC) board, is shown in FIG. 3. It includes a 62 pin edge card connector which is compatible with a standard PC bus 13, an EPROM 14, a 10/5 MHz jumper 15, V20 CPU 16, the 8155 parallel I/O integrated circuit 17, and the 34 pin edge card connector 18. The 62 pin edge card connector 13, is used to connect ADC board 6 to the SBC 8. The 34 pin edge card connector is used to connect SBC 8 to interface card 9.

Figure 4:
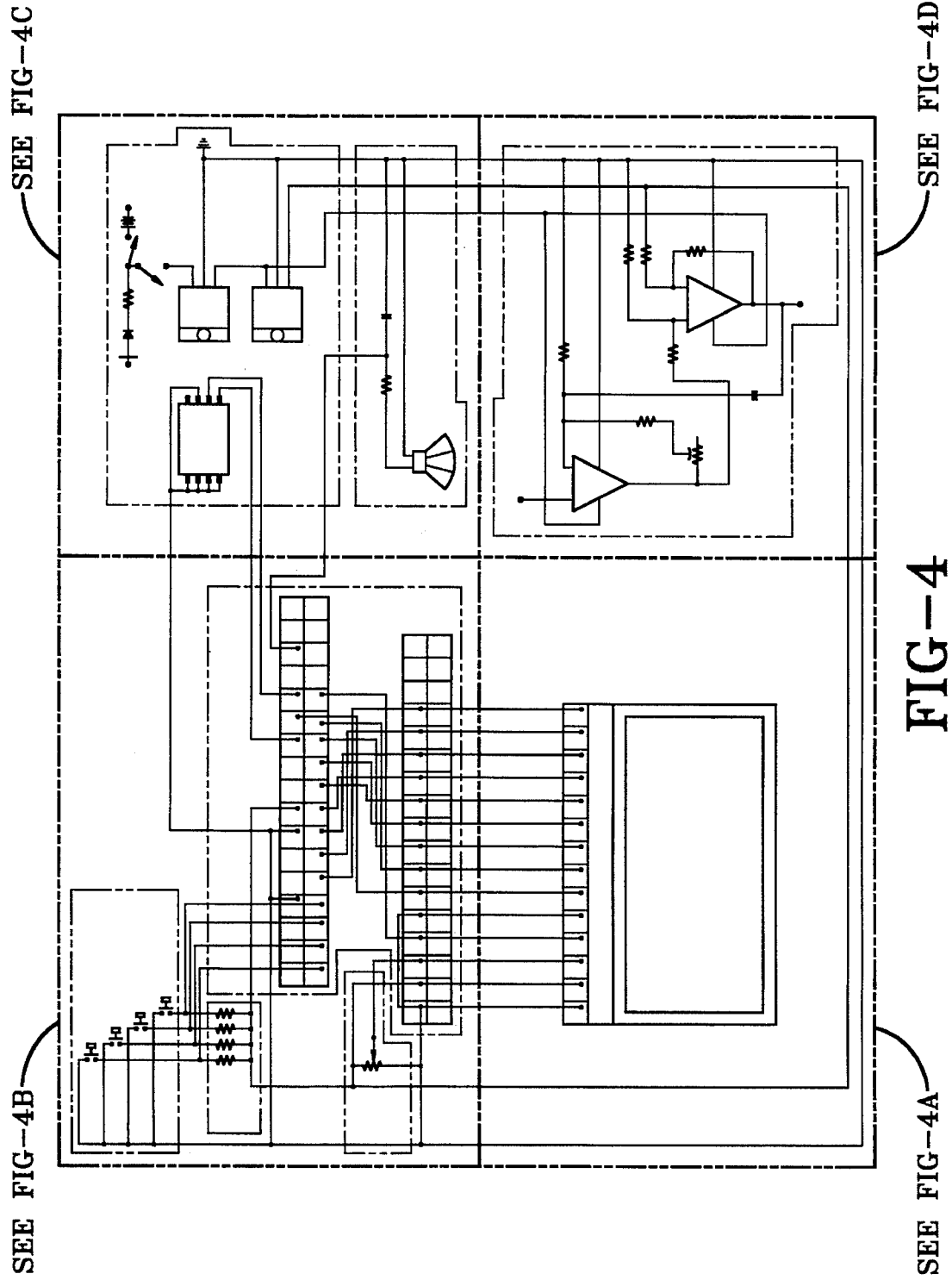
FIG. 4 is composed of FIGS. 4A, B, C and D which accumulatively illustrate a schematic diagram used in the preferred embodiment of an interface card.

The interface card 9 is more fully shown in FIG. 4. It includes an interface to Liquid Crystal Display 19, LCD, and the routing of control and data signals from the SBC to LCD 20, the LCD contrast adjustment potentiometer 21, the key pad 23 and pull up resistors of key pad 22, power regulation section 24, the RC filter and speaker section 25, and analog offset section 26.

Figure 5:
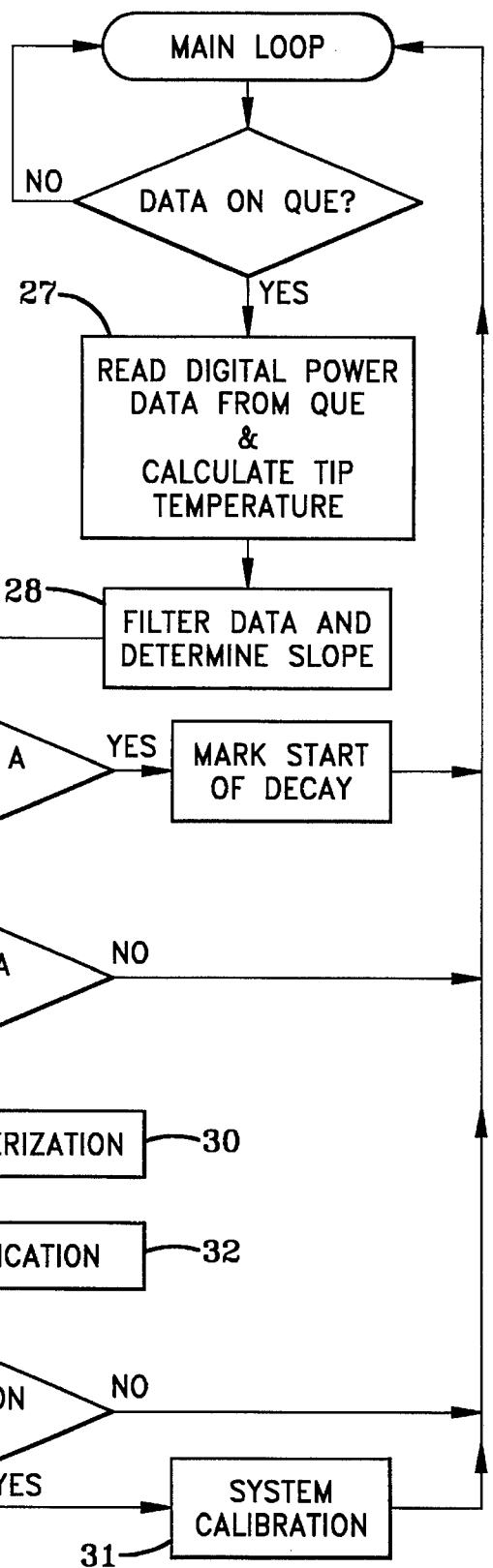
FIG. 5 is a flow chart of one embodiment of the invention.

FIG. 5 is a flow chart of the software manning on the SBC 8. In the preferred embodiment, the tip temperature 27 is calculated from the raw digital power data reading τ of the in line power meter. Calibrations are made by thermocoupling the tip of a soldering iron and curve fitting the temperature data with respect to the power sent to the tip of the iron, which is read into the device from the power meter. The function used to fit the data is as follows:

$$\text{Temp}(\tau) = A \cdot e^{(-1.0/(B \cdot \tau + C))} + (\tau \cdot \text{Err\_A} + \text{Err\_B})$$

Where A, B and C are the curve fitting coefficients and Err_A and Err_B are enhancements to the curve fitting that adjust to the relative error of the calculation.

Figure 6:
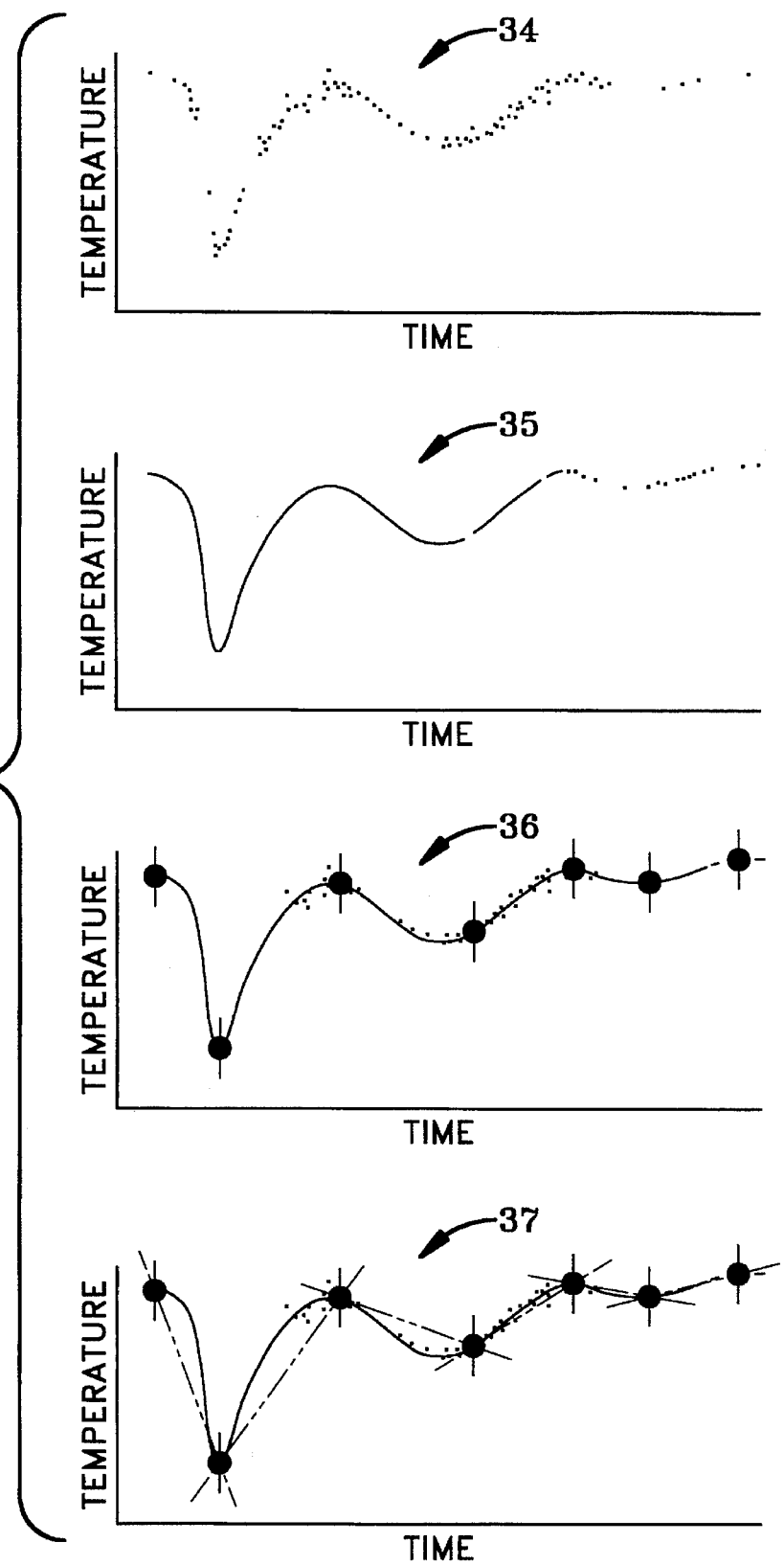
FIG. 6 is an example waveform involved in the invention.

The digital temperature data points initially take the form of a rough graph such as the example graph 34 shown in FIG. 6. The control software filters or smoothes these temperature data points 28. When the tip temperature data is first collected it may include spikes caused by anomalies in the data acquisition. To remove these spikes, the software applies a curve smoothing algorithm to the data. By averaging anywhere from 5 to 20 points, a new temperature for each point along the curve is computed resulting in a smoothed curve, 35. As the smoothed coefficient is increased, from 5 to 20, the smoothness of the data increases but the accuracy of the data decreases. The smooth coefficient is user adjustable and is set according to signal quality and sampling resolution. In the preferred embodiment, the sampling was done at 15 readings a second. For this sampling rate an average reading was calculated for every five points.

The next section in the control software locates the critical points in the smoothed temperature data points 29. The critical points are the beginning of the temperature decay and the beginning of the temperature recovery, shown in graph 36. At first glance these decay points seem to be simply the minimum and maximum points along the temperature curves. This is not the case however, because there may be instances of convection and noise which might be mistaken for soldering or cleaning or when the iron temperature recovers while in contact with the soldering connection. To avoid errors in identifying the critical points the anticipated rates or changes in the curves are calculated. This data, along with the minimum and maximum points, are then used to determine the critical decay points. The first step in finding the beginning of the temperature decay is to filter out any noise in the temperature graph 34. This is done by checking the temperature data points for a consistent number of temperature decreases. In the preferred embodiment, five consistent decreasing data points are checked. The final step in the temperature decay algorithm checks with a look-up table of tip rates of decay and ensures that the rate of decay of these data points is consistent with the soldering iron and tip the user has selected and has manually entered into the system. The anticipated rate of change over a minimum period of time, usually one third of a second, for the end of the soldering decay, is referred as the tip rating. This tip rating is measured in units of degrees Fahrenheit per second. The anticipated rate of change at the beginning of a soldering decay is fixed. In the preferred embodiment, the anticipated rate of change is set at approximately ten degrees per second for a minimum of one-third a second duration. A similar algorithm is used to check for the beginning of the temperature recovery. A consistent number of temperature data increases is checked. In the preferred embodiment, the number is five, and the rate of decrease is checked with a table of tip data, a table of temperature data for soldering irons and tips, to ensure that it is consistent with the soldering iron arid tip selected by the user.

Once the beginning and the ending points of temperature decays are located, the next step in the flow chart of FIG. 5 is curve characterization 30. This process is accomplished by fitting the decay data with a curve which follows the soldering process. In this instance, a second order polynomial curve is the appropriate fit as given below.

$$LN(t) = At^2 + Bt + C$$

The result is that a large array of temperature readings can be expressed in the form of just three parameters: A,B,C. From this curve fit equation the temperature, the temperature decay rate, the relative heat transfer, and the total heat transferred can be derived.

Each time the soldering iron comes into contact with the solder connection or the sponge, heat is transferred away from the tip and the temperature decays. The system calibration is a test to determine whether or not the temperature decays from soldering or cleaning with a specified soldering iron, are distinguishable from one another. The ability to discriminate between solder and clean can be computed with a given confidence level. The system is calibrated 31 by establishing the mean of both the soldering and cleaning operations and the intersection for the mean curves using a sample set of user initiated clean and solder operations. Initially the system uses the slope of the different operations to differentiate between solder, clean and transport operations (the iron is being transported to or from the connection). The greatest slope is classified as a clean operation and the smallest slope is classified as a solder operation. Any negative slopes are classified as transports. Once a sufficient number of sample operations have been computed and classified a T-test or hypothesis test will be performed to test the hypothesis: can the hypothesis of equality between clean and solder distributions be rejected? The distribution of the B values, the nonlinear slope values of the second order exponential curve fit, are used in a standard deviation calculation to determine the mount of intersection between the set of B values for the cleans and the solders. The system returns the confidence level of the test so the user can determine if it passes or fails the confidence test. Once the system passes the hypothesis test the system is statistically sound and the distinguishing between solder and cleans can be relied on. The rationale for allowing soldering irons to pass through calibration with less-than-perfect confidence is that the system can still be used effectively to measure iron and operator variability even with a small measurable degree of error.

Figure 7:
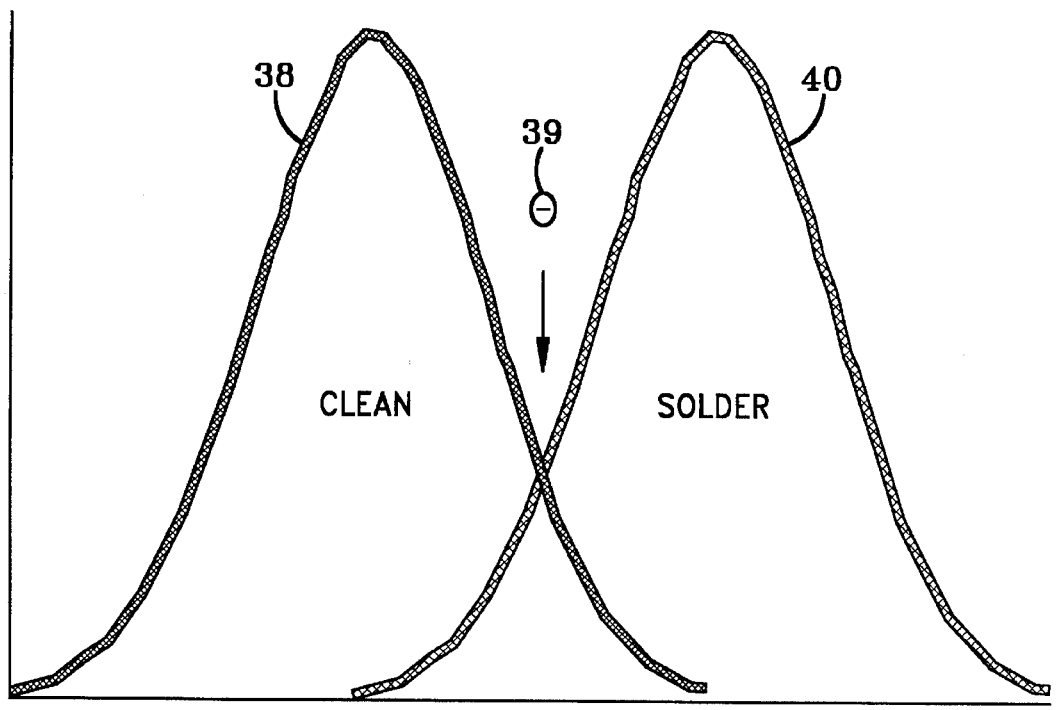
FIG. 7 is a standard distribution graph involved in the invention.

FIG. 7 shows a standard deviation distribution curves of B values from the clean and solder curve fits. A theta point is shown in FIG. 7 and is computed as the weighted average of mean solder and mean cleans slopes using the standard deviation from the mean of the weights. This theta point is then used in curve classification 32 to distinguish all further curve classifications as clean and solder operations. A curve fit with a slope that is less than Theta is classified as a clean operation and a curve fit slope that is greater than the Theta is classified as a solder operation. A curve fit value that is less than zero is classified as a transport operation. When the curve fit value is more than three standard deviations less than the mean solder distribution the operation is classified as other, I.E. convection, conduction to other objects, and movement of the tip during solder.

Once the soldering iron passes the calibration test, the system has been effectively taught how to classify decays as solder or clean operations and the curve classification cycle can continue identify gathering manual soldering process data. A graphing function is included in the personal computer version to verify the validity and accuracy of the program visually. Also, the graph function generates a display plotting tip temperature over time, comparisons of smoothed data over raw data (to get an indication of the loss of accuracy caused by the selection of coefficients for curve smoothing). The graphing function should also allows the user to observe the system's selection of critical maximum and minimum points on the curve and the computed time-on-connection and temperature drops. Further the graph function will prepare statistical process control graphs over user specified periods of time, single day, week, or a year. The graphical data includes mean and standard deviation for time-on-connection, mean and standard deviation of curve characterization, initial and average temperature, total time to solder board and longest time-on-connection.

What is claimed is:

1. A method for monitoring and collecting statistical information on soldering operations in a soldering system having a soldering means having a means for monitoring analog heat flow, a means for converting said analog heat flow into digital temperature data points, said digital temperature data points having a point at they begin to decay and a point at which they begin to recover, connected to said means for monitoring analog heat flow, and a computing means having a memory and being operatively connected to said means for converting analog heat flow, said method comprising the steps of:

reading the digital temperature data points into the memory of the computing means; and smoothing the digital temperature data points;

locating the beginning of the temperature decay as being when a consistent number of digital temperature points decrease;

locating the beginning of the temperature recovery as being when a consistent number of digital temperature points increase;

calibrating to distinguish between a soldering operation and a cleaning operation; and collecting statistical information on soldering operations, the statistical information including operator timing, time dependent temperature behavior, and distinguishing between operations such as the cleaning operation and the soldering operation.

2. The method of claim 1 wherein the steps of locating the beginning of the digital temperature data decay and recovery comprises:

classifying the temperature data points as the beginning of the temperature decay if a consistent number of digital temperature data points decrease and the rate of this decrease is consistent with the soldering iron and tip a user has selected, and classifying the digital temperature data point as the temperature recovery point if a consistent number of digital temperature data points increase, and if the rate of this recovery is consistent with the soldering iron and tip the user has selected.

3. The method of claim 2 wherein the step calibrating to distinguish between the soldering operation and the cleaning operation comprises:

calculating time, slope and curve fit data of a user initiated number of clean and solder operations;

classifying the user initiated operation as the cleaning operation if the slope of said user initiated operation is nearest to a greatest slope of the operations;

classifying the user initiated operation as the soldering operation if the slope of the user initiated operation is nearest to a smallest slope of the operations;

computing a statistical theta point, the theta point being the intersection between a standard deviation curve of the weighted average of the mean soldering operations and a standard deviation curve of the mean slopes of the cleaning operations; and performing a T-test on the soldering and the cleaning operations to determine a confidence level in the system's ability to distinguish between the soldering and cleaning operations.

4. The method of claim 3 wherein the step of collecting statistical information on soldering operations further comprises:

classifying the operation as a solder cleaning operation if the curve fit from the operation is less than the theta point, and classifying the operation as a soldering operation if the curve fit from the operation is greater than the theta point.

5. A system for monitoring and collecting statistical process control information on a soldering operation comprising:

a soldering means having a means for monitoring analog heat flow;

a means for converting said analog heat flow into digital temperature data points, said digital temperature data points having a point at they begin to decay and a point at which they begin to recover, connected to said means for monitoring analog heat flow; and a computing means having a memory and being operatively connected to said means for converting analog heat flow;

a means for reading the digital temperature data points into the memory of the computing means; and a means for smoothing the digital temperature data points;

a means for locating the beginning of the temperature decay as being when a consistent number of digital temperature points decrease;

a means for locating the beginning of the temperature recovery as being when a consistent number of digital temperature points increase;

a means for calibrating to distinguish between a soldering operation and a cleaning operation; and a means for collecting statistical information on soldering operations, the statistical information including operator timing, time dependent temperature behavior, and distinguishing between operations such as the cleaning operation and the soldering operation.

6. The system of claim 5 wherein the means for locating a beginning of the temperature data decay and recovery comprises:

a means for classifying the digital temperature data as the beginning of the temperature decay if a consistent number of digital temperature data points decrease and the rate of this decrease is consistent with the soldering iron and tip a user has selected, and a means for classifying the temperature data as the beginning of the temperature recovery if a consistent number of digital temperature data points increase, and if the rate of this recovery is consistent with the soldering iron and tip the user has selected.

7. The system of claim 6 wherein the means for calibrating to distinguish between the soldering operation and the cleaning operation comprises:

a means for calculating time, slope and curve fit data of the user initiated number of clean and solder operations;

a means for classifying the user initiated operation as the cleaning operation if the slope of the user initiated operation is nearest to a greatest slope of the said operations;

a means for classifying the user initiated operation as the soldering operation if the slope of said user initiated operation is nearest to a smallest slope of the operations;

a means for computing a statistical theta point, the theta point being the intersection between a standard deviation curve of the weighted average of the mean soldering operations and a standard deviation curve of the mean slopes of the cleaning operations; and a means for performing a T-test on the soldering and the cleaning operations to determine a confidence level in the system's ability to distinguish between the soldering and cleaning operations.

8. The system of claim 7 wherein the means for collecting statistical information on soldering operations further comprises:

a means for classifying the operation as a cleaning operation if the curve fit from the operation is less than the theta point, and a means for classifying the operation as a soldering operation if the curve fit from the operation is greater than the theta point.

9. The system of claim 5, wherein the means for monitoring the analog heat flow monitors the analog voltage of the soldering means and, the means for converting the heat flow into digital temperature data points converts the analog voltage into digital voltage data points and converts the digital voltage data points into power data points and converts the digital power data points into digital temperature data points.

10. The system of claim 5 wherein the soldering means includes a means for monitoring the temperature digitally, and the computing means is connected to said means for monitoring the temperature digitally.

11. The system of claim 5, wherein the means for converting analog heat flow into digital temperature data is adjustable to read the heat flow within a narrowly defined range of user selected values to ensure greater accuracy for an 8 bit computing system.

12. The system of claim 5, wherein the computing means is a standard commercial computer and wherein the means for converting the heat flow into digital temperature data points is an analog to digital card in said standard commercial computer.

13. The system of claim 5, wherein the soldering means, the means for converting analog heat flow into digital temperature data points, the computing means, the means for reading the digital temperature data points into the memory of the computing means, the means for smoothing the digital temperature data points, the means for locating the beginning of the temperature decay, the means for locating the beginning of the temperature recovery, the means for calibrating to distinguish between a soldering operation and a cleaning operation, and the means for collecting statistical information on soldering operations are contained within a stand alone, real time monitor.

14. The system of claim 7, wherein the heat transferred in the soldering process is computed by calculating the area under the curve of temperature readings.

* * * * *